United States Patent [19]
Posh

[11] 3,732,750
[45] May 15, 1973

[54] DIFFERENTIAL DRIVE ASSEMBLY

[75] Inventor: Raymond C. Posh, Livonia, Mich.

[73] Assignee: Lear Siegler, Inc., Detroit, Mich.

[22] Filed: June 7, 1971

[21] Appl. No.: 150,318

[52] U.S. Cl. .................... 74/650, 74/710.5, 192/50
[51] Int. Cl. ............................................. F16h 35/04
[58] Field of Search ......................... 74/650, 710.5; 192/50

[56] References Cited

UNITED STATES PATENTS

| 1,651,228 | 11/1927 | Ross ........................................ 74/650 |
| 3,344,686 | 10/1967 | Baker ...................................... 74/650 |
| 2,638,795 | 5/1953 | King ........................................ 74/650 |
| 3,173,309 | 3/1965 | Seliger .................................... 74/650 |
| 3,283,611 | 11/1966 | Weismann et al. .................... 74/650 |

Primary Examiner—C. J. Husar
Attorney—McGlynn, Reising, Milton & Ethington

[57] ABSTRACT

A differential drive assembly including a barrel-like housing surrounding a pair of juxtaposed coaxial sleeves internally splined to receive axles. A first set of sprags or locking elements are disposed circumferentially about one of the sleeves between the circular outer surface of the sleeve and the housing and a second set of like sprags are similarly disposed between the housing and the other sleeve. In one embodiment a single cage member having a central band with fingers extending from opposite sides thereof is disposed between the sleeves and the housing to coact with the sprags, the sprags of this embodiment having arcuate surfaces disposed in recesses in the housing having mating or the same arcuate surfaces so that each sprag rotates about a longitudinal axis. In the second embodiment there is included two similar cage members and the sprags have oppositely disposed arcuate surfaces which are interconnected by generally parallel and spaced side surfaces. The unitary cage members for coacting with both sets of sprags moves both sets of sprags in unison in one mode of operation and limits the amount of relative movement between the first and second sets of sprags when in the second mode of operation.

16 Claims, 7 Drawing Figures

INVENTOR.
Raymond C. Posh
BY
Barnard, McGlynn & Reising
ATTORNEYS

INVENTOR.
Raymond C. Posh

PATENTED MAY 15 1973 3,732,750

INVENTOR.
Raymond C. Posh
BY
Barnard, McGlynn & Reising
ATTORNEYS

DIFFERENTIAL DRIVE ASSEMBLY

The instant invention relates to a drive assembly for transmitting power from an input shaft to two output shafts and more particularly to such a drive assembly wherein one output shaft may rotate faster than the other output shaft when the other output shaft is being driven by the input shaft but cannot rotate slower than the output shaft being driven by the input shaft. Said another way, this invention relates to a drive assembly of the type wherein the two output shafts are normally always driven by the input shaft but which allows either of the output shafts to rotate faster than it would be rotated at any given time by the input shaft.

Assemblies of this type have been used as differential drive assemblies in automotive land vehicles.

Assemblies of the type to which the instant invention pertains include a drive member rotated by the input shaft and a pair of driven members which are connected to output shafts. Sprays or locking elements are disposed between the drive member and the driven members so that during the operative mode they are wedged between the drive member and the driven members for rotating the driven members in response to rotation of the drive member. Many of these prior art assemblies utilize separate cage devices for positioning the two separate sets of sprags or locking elements. The cage components in these prior art assemblies are complex and/or will allow the two separate sets of sprags to be disposed in opposite locking positions. That is, the sprags of one set can be wedged between the drive member and one of the driven members in a manner which would effect rotation of that driven member in one direction whereas the other set of sprags can be oppositely disposed in a position which would effect rotation of the other driven member in the opposite direction. Additionally, the locking elements in the prior art assemblies typically, when wedged between the drive and driven members, are in line contact with such members thus creating high stresses.

Examples of such prior art assemblies, which are regarded as most pertinent to the instant invention, are disclosed in U.S. Pat. Nos. 1,047,182; 1,626,907; 1,902,449; 2,638,795; 3,191,458; 3,310,997; 3,344,686; and 3,447,396.

Accordingly, it is an object and feature of this invention to provide an improved differential assembly which is simplified in construction and overcomes some of the disadvantages of the prior art assemblies.

In correlation with the foregoing object and feature, it is another object and feature of this invention to provide such a differential drive assembly including at least one unitary cage means disposed about the first and second sets of sprags for moving the first and second sets of sprags in unison and for preventing movement of either of the sets of sprags to either of the locked positions when the other set of sprags is in the other or opposite locked position.

Other objects and attendant advantages of the present invention will be readily appreciated as the same becomes better understood by reference to the following detailed description when considered in connection with the accompanying drawings wherein.

Figure 1:
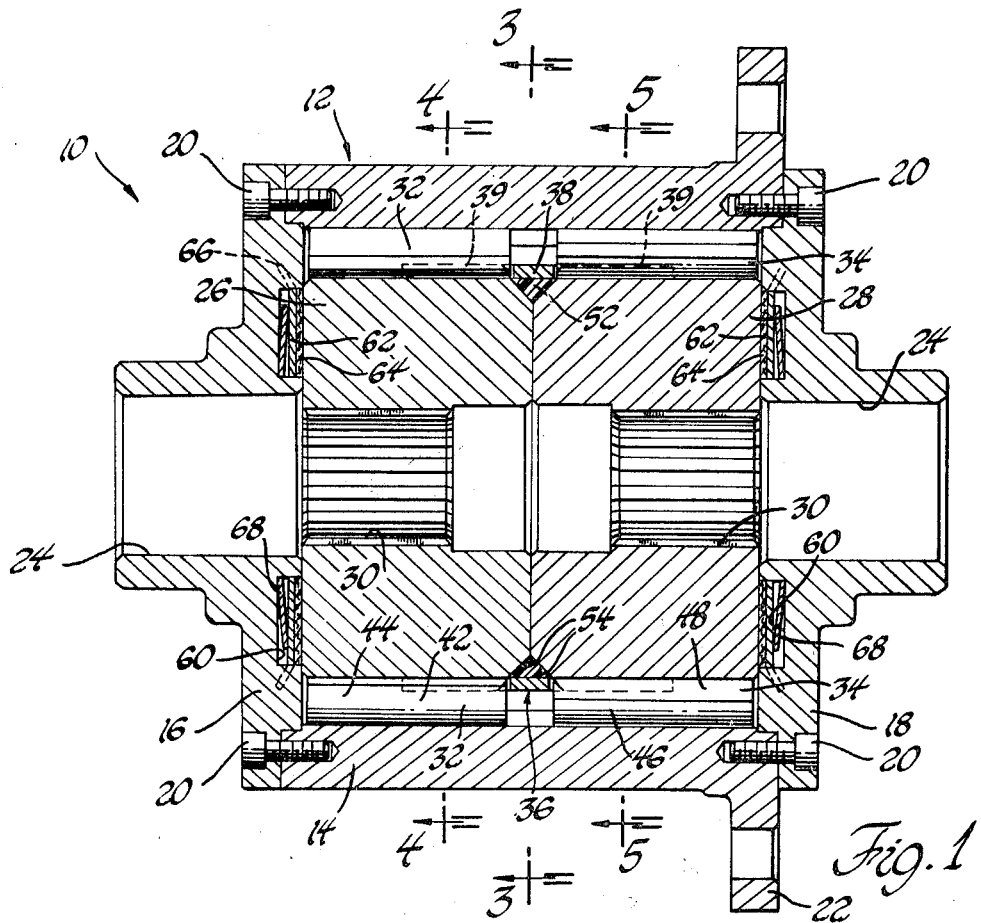
FIG. 1 is a cross sectional view of a preferred embodiment of the instant invention.

Referring to the drawings, a preferred embodiment of a differential drive assembly constructed in accordance with the instant invention is generally shown at 10 in FIG. 1. An alternative embodiment is shown at 110 in FIG. 6. The two embodiments will be described simultaneously with like or similar components of the two embodiments being indicated by like numerals but separated by 100.

The differential drive assembly includes a rotatable drive means defined by a barrel-like housing 12 or 112. The housing includes a cylindrical member 14 or 114. Also included are a pair of spaced end plate members 16 and 18 or 116 and 118. Plate members are secured to the ends of the cylindrical members 14 and 114 by bolts 20 and 120. The cylindrical member 14 includes a flange 22 which is adapted by holes for attachment to a ring gear (not shown) for rotating the housing. The cylindrical member 114 includes a flange 122 which coacts with the plate member 118 by holes therethrough for attachment to a ring gear (not shown) to rotate the housing 112.

The end plate members have openings 24 or 124 therethrough through which a splined axle shaft may extend.

The assembly also includes a first rotatable driven means comprising an annular sleeve 26 or 126 disposed concentrically within the cylindrical member of the housing. Also included is a second rotatable driven means comprising a second annular sleeve 28 or 128 disposed concentrically within the cylindrical member. The sleeves of each assembly are axially aligned and have splined bores 30 or 130 therein for receiving the splined ends of axle shafts.

The assembly also includes first sprag means comprising the first set of sprags 32 or 132. The sprags 32 react between the cylindrical member 14 and the sleeve 26 when in first and second locked positions on either side of a neutral position to rotate the sleeve 26 in response to rotation of a cylindrical member 14 and for allowing the sleeve 26 to rotate faster than the cylindrical member 14 when in the neutral position. In the same fashion the sprags 132 coact between the cylindrical member 114 and the sleeve 126.

Each assembly also includes second sprag means comprising the second set of sprags 34 or 134. The sprags 34 react between the cylindrical member 14 and the sleeve 28 when in first and second locked positions on either side of a neutral position to rotate the sleeve 28 in response to rotation of the cylindrical member 14 and for allowing the sleeve 28 to rotate faster than the cylindrical member 14 when in the neutral position. The sprags 134 react in a similar fashion between the cylindrical member 114 and the sleeve 128.

Figure 3:
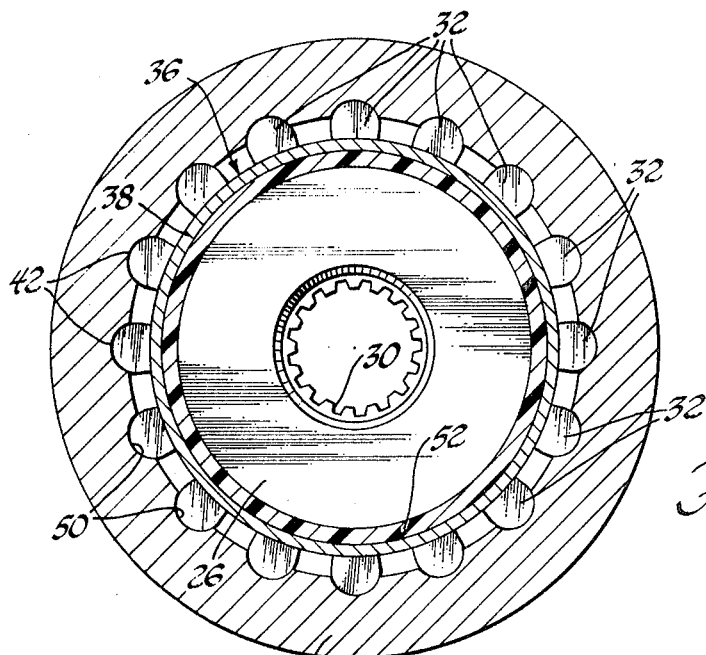
FIG. 3 is a cross sectional view taken substantially along line 3—3 of FIG. 1.
Figure 4:
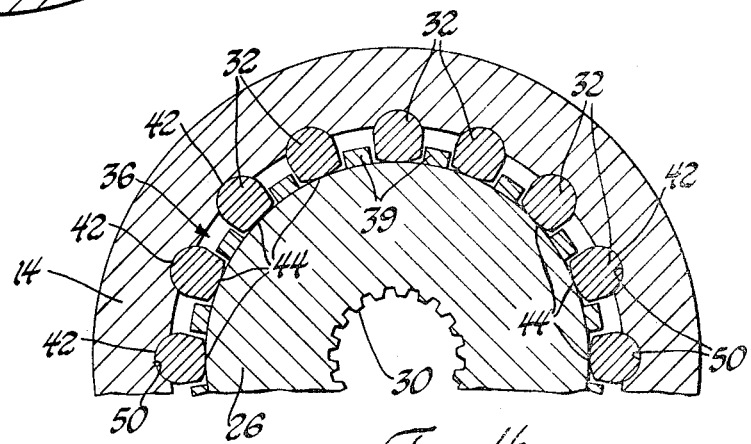
FIG. 4 is a fragmentary cross sectional view taken substantially along line 4—4 of FIG. 1.
Figure 5:
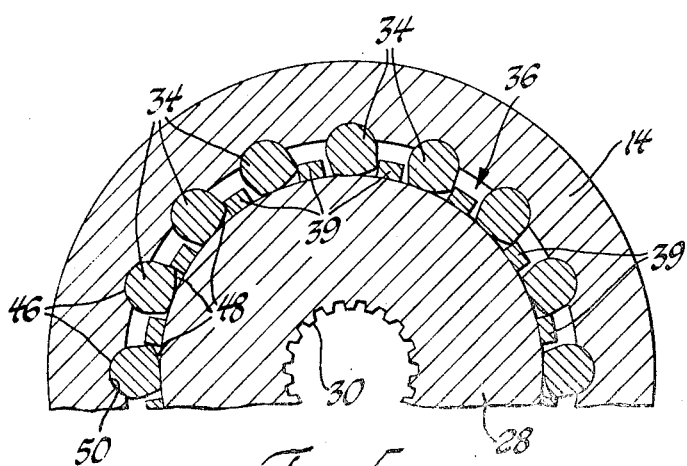
FIG. 5 is a fragmentary cross sectional view taken substantially along line 5—5 of FIG. 1.

The sprags 32 and 34 are in the neutral position as illustrated in FIGS. 3 and 4 and are in one of the locked positions as illustrated in FIG. 5. The sprags 134 are shown in the neutral position in FIG. 7 and are in one of the locked positions when rotated or cocked about a longitudinal axis so as to be wedged between the cylindrical member 114 and the sleeve 128.

Each assembly also includes the unitary cage means defined by the cage member 36 in embodiment 10 and the cage members 136 and 137 in embodiment 110. These cage members are disposed about the first and second sets of sprags in each assembly for moving the first and second sets of sprags in unison during one mode of operation of the assembly and for preventing movement of either of the sets of sprags to one of their locked positions when the sprags in the other set is in the other or opposite locked position. The sleeves 26 and 28 as well as the sleeves 126 and 128 are axially aligned and the sets of sprags are disposed annularly about the sets of sleeves to react between the cylindrical members 14 and 114 and the respective associated sleeves. Each of the cage members comprises an integral member having a central circular band with fingers disposed circumferentially thereabout and extending from opposite sides thereof, the band of cage member 36 being indicated at 38 and the fingers thereof at 39, the band of the cage member 136 being indicated at 138 and the fingers thereof at 139, the band portion of the cage member 137 being indicated at 140 and the fingers thereof at 141. All of the sprags are elongated and the sprags of one set are disposed in the spaces between the fingers on one side of the band of a cage member and the sprags of the second set are disposed in the spaces between the fingers on the other side of the band.

Referring now specifically to the embodiment of FIGS. 1 through 5, the sprags 32 of the first set have opposite surfaces 42 and 44 for wedging engagement between the cylindrical member 14 and the sleeve 26 when in either of the first and second locked positions. The sprags 34 of the second set are identical to the sprags 32 and also include first and second surfaces 46 and 48 for wedging engagement between the cylindrical member 14 and the sleeve 28 when in one of the first and second locking positions, one of which is shown in FIG. 5. Both sets of sprags 32 and 34 have neutral positions, the neutral position of sprag 32 being illustrated in FIGS. 3 and 4. The neutral position is between the first and second locked positions for allowing relative rotation between the cylindrical member 14 and the associated sleeve member 26 or 28.

The opposite surfaces 42 and 44 of the sprags 32 are circular but of small and large radii, respectively. In other words, the surface 42 is defined with a smaller radius than is the surface 44. In a like manner, the surfaces 46 of the sprags 34 are of a smaller radius than the surfaces 48; that is, the sprags 32 and 34 are identical. Each of the sprags 32 and 34 are disposed in a recess 50 in the cylindrical member 14. Each recess 50 is circular and has the same radius as the small radius surface 42 and 46 of the sprags so as to be in rotative surface engagement therewith whereby each sprag is rotatably supported in a recess for rotation about a longitudinally extending axis which coincides with the center of the arc defining the surfaces 42 and 46 as well as the surfaces of the recesses 50.

It will be noted that because of the contiguous surface arcuate engagement between the sprags 32 and 34 with the recesses in which they are disposed, there is no line contact between these sprags and the cylindrical member 14.

The sprags 32 of the first set are rotated in one direction to a first locked position for rotating the sleeve 26 in response to rotation of the cylindrical member 14 in one direction and are rotated and moved to the second or opposite locked position for rotating the sleeve 26 in the opposite direction. In the same fashion, the sprags 34 of the second set are rotated to a first locked position, as illustrated in FIG. 5, for rotating the sleeve 28 in response to rotation of the cylindrical member 14 in one direction and are rotated to a second or opposite locked position opposite that illustrated in FIG. 5 for rotating the sleeve 28 in the opposite direction.

As is well known, when a vehicle is cornering, the wheel on the outside of the turn rotates faster than the wheel on the inside of the turn. Thus with a positive drive differential constructed in accordance with the instant invention, the cylindrical member 14 will be rotating the sleeve connected to the wheel on the inside of the turn whereas the opposite sleeve will be rotating faster and the sprags associated therewith will be in the neutral position. The fingers 39 of the cage 36 are configured and spaced, however, for preventing the sprags of one set from moving to one locked position when the sprags of the other set are in the other or opposite locked position and vice versa, both as to positions and the sets of sprags. More specifically, assume that the sleeve 26 is driving the wheel on the inside of a turn and the sleeve 28 is rotating faster than the cylindrical drive member 14 so that the sprags 32 are in a locked position whereas the sprags 34 are in the neutral position, the cage 36 will prevent the sprags 34 from moving all the way to the opposite locked position. Said another way, in this situation the cage will prevent the sprags 34 from moving out of one or a first locked position and all of the way to the opposite or second locked position while the sprags 32 remain in the first locked position. Specifically, the cage member 36 limits the relative movement between the two separate sets of sprags such that if one set of sprags is in a locked position, the opposite set of sprags cannot move out of the parallel locked position any farther than the neutral position. The cage member 36 therefore provides a positive stop and one which is unyielding.

It will be noted that the band 38 of cage member 36 is disposed over both sleeves 26 and 28. The assembly also includes a single friction means comprising the resilient plastic O-ring 52 which reacts between the cage member 36 and both of the sleeves 26 and 28 for moving the cage member 36 in response to movement of the sleeves 26 and 28. It will be noted that the sleeves 26 and 28 abut one another at the inward faces thereof and are bevelled at 54 at the inner face therebetween to define a groove extending annularly thereabout and the plastic O-ring 52 is disposed in the groove and engages the band portion 38 of the cage member 36. Assuming that the assembly is at rest, both sets of sprags 32 and 34 may be in the neutral position but must be moved to a locked position. Upon rotation of the cylindrical member 14, the sprags 32 and 34 will be moved as a result of the frictional engagement between the O-ring 52 and the cage member 36 because the cage member 36 will remain in position with the sleeves 26 and 28, thus causing movement of the sprags 32 and 34 to a locked position. The plastic O-ring 152 in the embodiment 110 is associated with the sleeves 126 and 128 in a similar manner to frictionally engage the inner cage member 136 for performing a like function.

Figure 2:
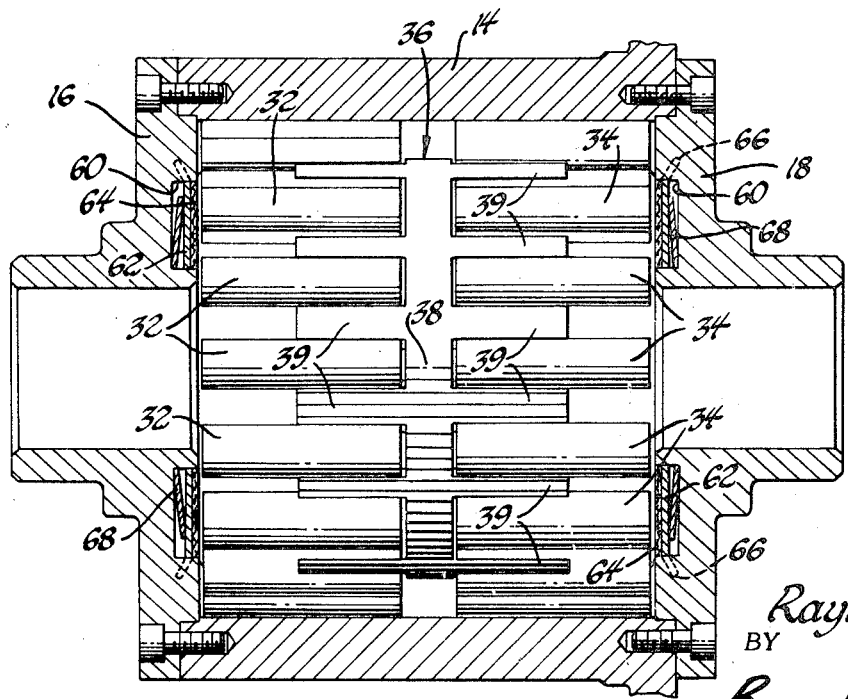
FIG. 2 is a cross sectional view similar to FIG. 1 but without showing the driven members, the cage means and the sprags in cross section.

The assembly of this invention may also include drag means reacting between the housing and at least one of the sleeves for rotating the housing with the sleeve when the housing is free wheeling, although such a drag means is only shown in the embodiment of FIGS. 1 and 2. More specifically, the end plate members 16 and 18 have annular recesses 60 therein disposed adjacent the outward end faces of the sleeves 26 and 28. The drag means includes a brake assembly disposed in these recesses and reacting between the associated plate member and the adjacent sleeve. Each brake assembly includes an annular washer-like brake shoe element 32 having frictional material 64 disposed thereon engaging the outward end face of the adjacent sleeve. The brake shoe element 62 is preferably made of metal and has projections 66 extending radially therefrom and into recesses or slots (not shown) in the plate members 16 and 18 for preventing relative rotation between the end plate members 16 and 18 and the shoe elements 62. Each brake assembly also includes a spring element comprising the bellville-type washer 68 reacting between the associated plate member and the brake shoe element for urging the brake shoe element against the end face of the adjacent sleeve.

The brake assemblies are included to prevent damage to the assembly. When an automobile is cornering and one wheel is moving faster than the other and the application of rotative power to the cylindrical member 14 is discontinued, it is possible for the cylindrical member 14 to oscillate between opposite locked positions between the two sleeves. In other words, assuming a vehicle is cornering and the sleeve 26 is driving the inside wheel and rotational power is discontinued to the member 14, the member 14 may become unlocked from the sleeve 26 as it slows in rotational speed and become locked in the opposite direction with the sleeve 28 as the sleeve 28 drives the cylindrical member 14. Upon becoming locked with the sleeve 28, the cylindrical member 14 may rebound in the opposite direction far enough to lock in the first position with sleeve 26, thus oscillating between opposite locked positions between the two sleeves. Such is prevented by incorporating the brake assembly because if rotative power is discontinued to the cylindrical member 14, the friction between these brake assemblies and the sleeves will insure that the housing rotates with one of the sleeves and does not oscillate between opposite locked positions with the two sleeves. It will be obvious to those skilled in the art that instead of utilizing two brake assemblies as illustrated, only one brake assembly need be utilized to insure rotation of the housing 12 with at least one of the sleeves to prevent such oscillation. When two brake assemblies are utilized, as shown, the housing in such a condition will rotate with the fastest rotating of the two sleeve members.

Figure 6:
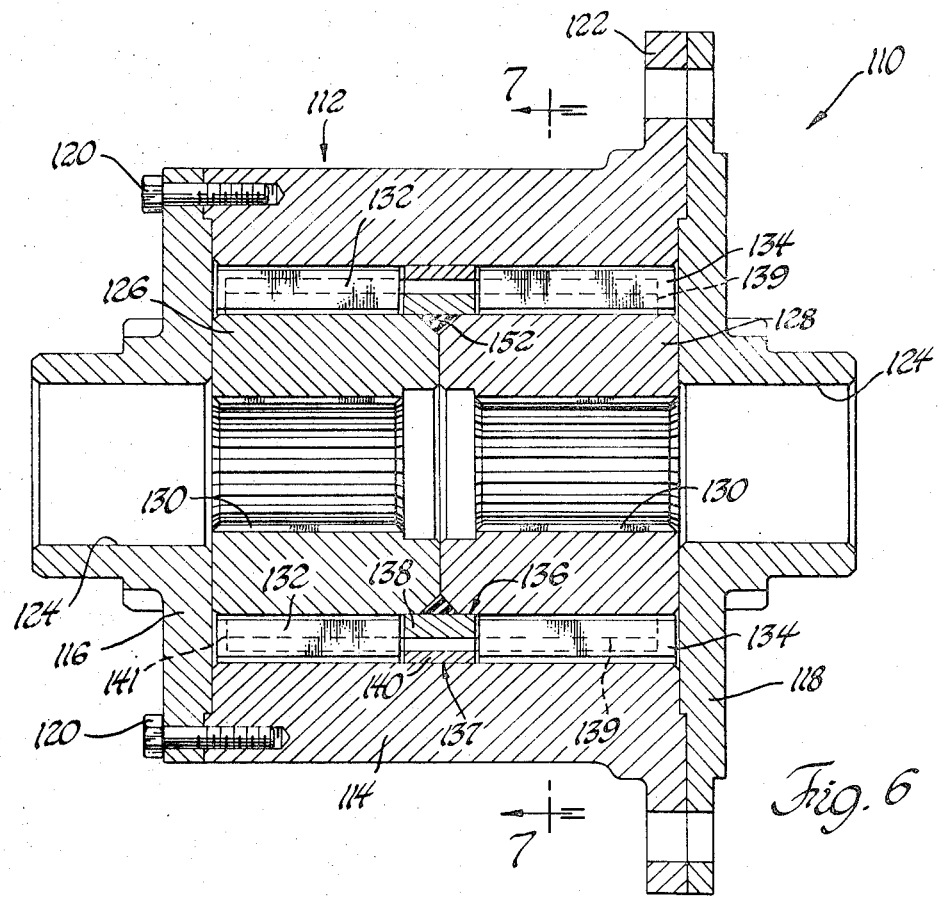
FIG. 6 is a cross sectional view analogous to FIG. 1 but showing another preferred embodiment of the instant invention.
Figure 7:
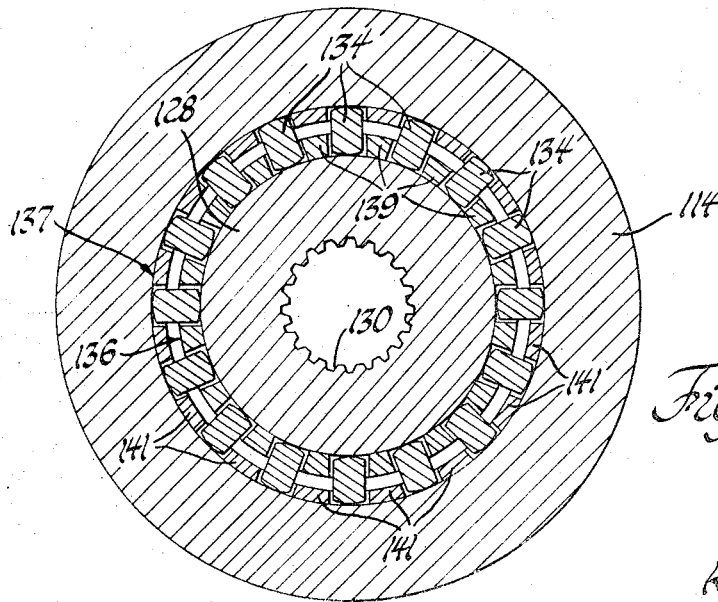
FIG. 7 is a cross sectional view taken substantially along line 7—7 of FIG. 6.

Turning now to the embodiment 110 of FIGS. 6 and 7, this embodiment differs from the first embodiment in the configuration of the sprags and by including a second cage member 137 constructed similarly to the first cage member 136. The second cage member 137 is disposed concentrically about the first cage member 136, as best illustrated in FIG. 7.

The sprags 132 and 134 have opposite wedging surfaces which are identical and are circular and are interconnected by spaced parallel side surfaces, as illustrated in FIG. 7. The fingers of the cage members 136 and 137 are disposed adjacent the parallel side surfaces and are illustrated in FIG. 7. The two cage members 136 and 137 cooperate to move the sprags 132 and 134 to the opposite locking position upon slight relative movement between the cylindrical member 114 and the sleeves 126 and 128. Otherwise the embodiment of FIGS. 6 and 7 operates in a similar fashion to the first described embodiment 10.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, the invention may be practiced otherwise than as specifically described.

The embodiments of the invention in which an exclusive property or privilege is claimed are defined as follows:

1. A differential drive assembly comprising: rotatable drive means, first rotatable driven means, second rotatable driven means, first sprag means for reacting between said drive means and said first driven means when in first and second locked positions on either side of a neutral position to rotate the latter in response to rotation of said drive means and for allowing said first driven means to rotate faster than said drive means when in said neutral position, second sprag means for reacting between said drive means and said second driven means when in first and second locked positions on either side of a neutral position to rotate the latter in response to rotation of said drive means and for allowing said second driven means to rotate faster than said drive means when in said neutral position, and at least one unitary cage means disposed about said first and second sprag means for moving said first and second sprag means in unison and for preventing movement of either of said sprag means to one of said locked positions when the other sprag means is in the opposite locked position.

2. An assembly as set forth in claim 1 including a single friction means reacting between said cage means and said first and second driven means for moving said cage means in response to movement of said first and second driven means.

3. An assembly as set forth in claim 1 including drag means reacting between said drive means and at least one of said driven means for rotating said drive means with said one of said driven means when said drive means is free wheeling.

4. An assembly as set forth in claim 1 wherein said cage means includes an integral cage member having a central circular band with fingers disposed circumferentially thereabout and extending from opposite sides thereof.

5. An assembly as set forth in claim 4 wherein said first and second sprag means include first and second sets of elongated sprags with the sprags of said first set being disposed in the spaces between the fingers on one side of said band and the sprags of said second set being disposed in the spaces between the fingers on the other side of said band.

6. An assembly as set forth in claim 5 wherein each of said sprags of said first set has opposite surfaces for wedging engagement between said drive means and said first driven means when in one of said first and second locked positions, said neutral position of said sprags of said first set being between said first and second locked positions for allowing relative rotation between said drive means and said first driven means, said sprags of said first set being in the first locked position for rotating said first driven means in response to rotation of said drive means in one direction and in the second locked position for rotating said first driven means in the opposite direction in response to rotation of said drive means in said opposite direction, each said sprags of said second set has opposite surfaces for wedging engagement between said drive means and said second driven means when in one of said first and second locked positions, said neutral position of said sprags of said second set being between said first and second locked positions for allowing relative rotation between said drive means and said second driven means, said sprags of said second set being in the first locked position for rotating said second driven means in response to rotation of said drive means in one direction and in the second locked position for rotating said second driven means in the opposite direction in response to rotation of said drive means in said opposite direction, said fingers being configured and spaced for preventing said first set of sprags from moving to the second locked position when said sprags of said second set are in the first position, and vice-versa both as to positions and set of sprags.

7. An assembly as set forth in claim 6 wherein said drive means includes a housing having a cylindrical member, said first driven means comprises a first annular sleeve disposed concentrically within said cylindrical member, said second driven means comprises a second annular sleeve disposed concentrically within said cylindrical member, said sleeves being axially aligned, said sprags disposed annularly about said sleeves to react between said cylindrical member and said sleeves said cage member disposed about said sleeves with the band thereof disposed over both sleeves.

8. An assembly as set forth in claim 7 including a single friction means reacting between said cage member and both of said sleeves for moving said cage member in response to movement of said first and second sleeves.

9. An assembly as set forth in claim 8 wherein said sleeves abut one another at the inward end faces thereof and are bevelled thereabout at the interface therebetween to define a groove extending annularly thereabout, said band of said cage member being disposed over said groove, said single friction means comprises a resilient ring disposed in said groove and engaging said band.

10. An assembly as set forth in claim 7 including drag means reacting between said housing and at least one of said sleeves for rotating said housing with one of said sleeves when said housing is free wheeling.

11. An assembly as set forth in claim 10 wherein said housing includes a pair of end plate members secured to the ends of said cylindrical member and disposed adjacent the outward end faces of said sleeves, said drag means includes a brake assembly reacting between at least one end plate member and the adjacent sleeve and including an annular washer-like brake shoe element engaging the outward end face of the adjacent sleeve and a spring element reacting between the plate member and the brake shoe element.

12. An assembly as set forth in claim 11 wherein said brake shoe element has projections extending radially therefrom and into recesses in said plate member for preventing relative rotation between said end plate member and said brake shoe element.

13. An assembly as set forth in claim 12 wherein said spring element is a bellville type washer.

14. An assembly as set forth in claim 7 wherein said opposite surfaces of each sprag are circular and of large and small radii respectively, each sprag being disposed in a recess in one of said cylindrical member and a sleeve, said recess being circular and with the same radius as the small radius surface of said sprags so as to be in surface engagement therewith whereby each sprag is rotatably supported in a recess for rotation about a longitudinally extending axis.

15. An assembly as set forth in claim 7 including a second cage member constructed similarly to said first mentioned cage member, said second cage member disposed concentrically about said first cage member, and wherein said opposite surfaces of each sprag are circular and are interconnected by spaced parallel side surfaces, and fingers of said cage members being disposed adjacent said parallel side surfaces.

16. A drive assembly comprising: concentric rotatable drive and driven means, a plurality of sprags disposed between said means for movement between a locked position in wedging engagement between said means for rotating said means in unison and a neutral position out of said wedging engagement for allowing relative rotation between said means, each sprag being elongated with a cross section including opposite circular surfaces of small and large radii respectively, the surface with the small radius of each sprag being disposed in a recess in one of said means, each recess being circular and with the same radius as the mating surface with the small radius whereby each sprag is rotatably supported for rotation about a longitudinally extending axis which defines the center of the arc defining the surface of small radius thereof and the surface of the adjacent recess.

* * * * *